March 17, 1964   A. E. BADER ETAL   3,124,986
AUTOMATIC CONTROLS FOR MACHINE TOOLS Original Filed Jan. 17, 1955   5 Sheets-Sheet 1

INVENTORS
ALFRED E. BADER AND
ADOLF FR. UMGELTER

BY Dicke and Cray

ATTORNEYS

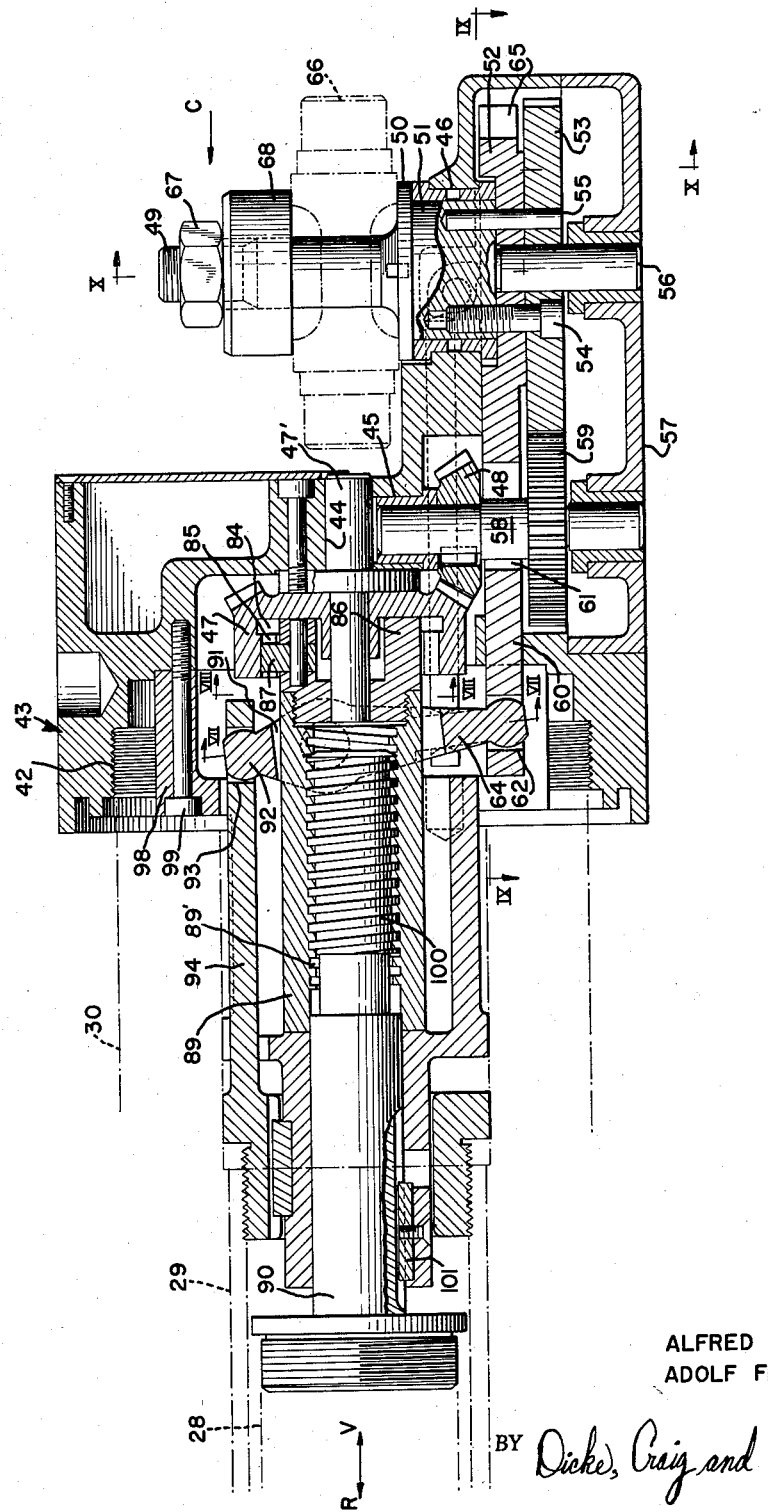

March 17, 1964   A. E. BADER ETAL   3,124,986
AUTOMATIC CONTROLS FOR MACHINE TOOLS
Original Filed Jan. 17, 1955   5 Sheets-Sheet 3
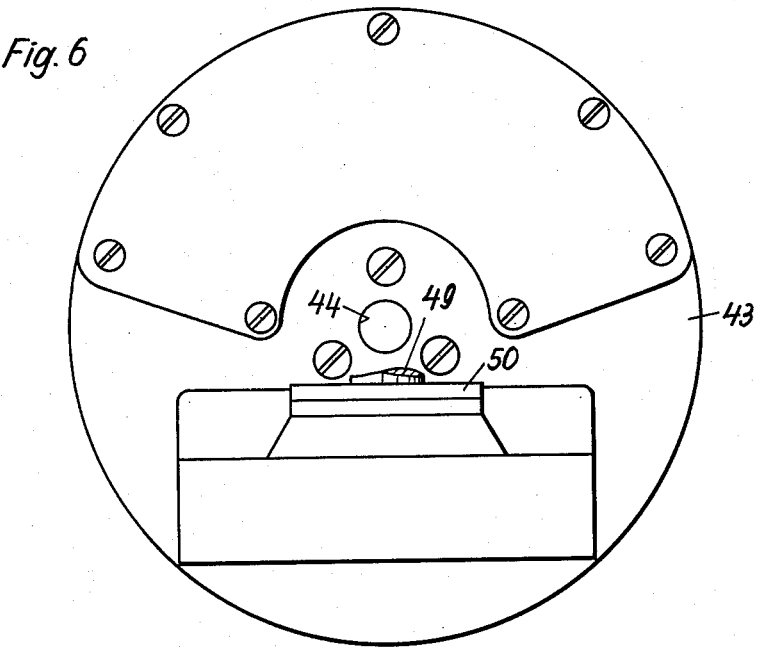
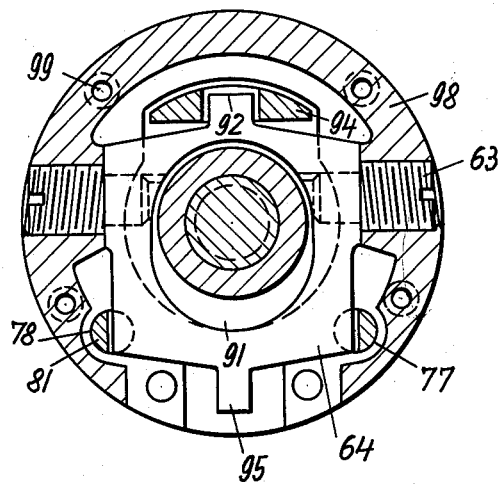
INVENTORS
ALFRED E. BADER AND
ADOLF FR. UMGELTER
BY Dicke and Craig
ATTORNEYS

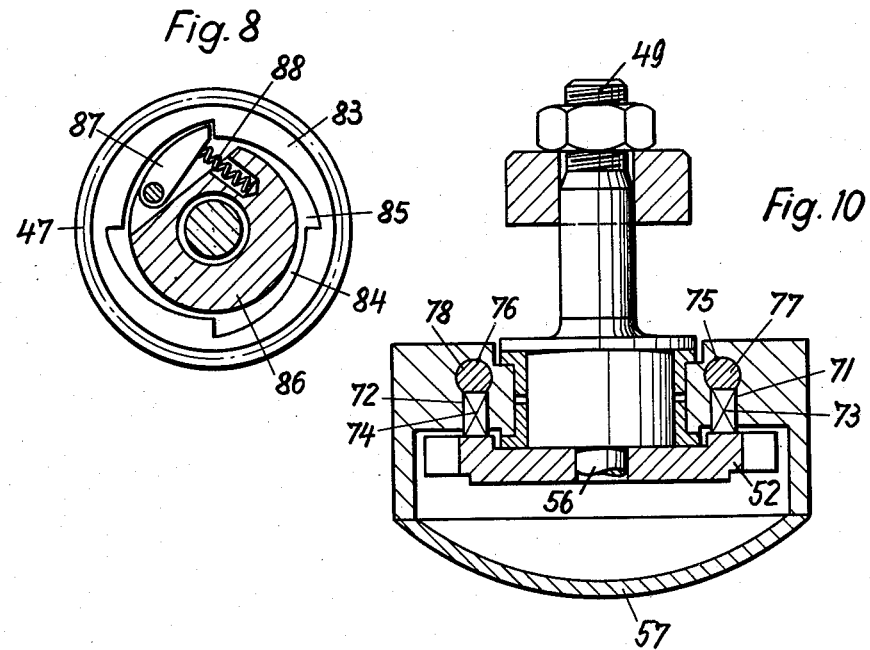
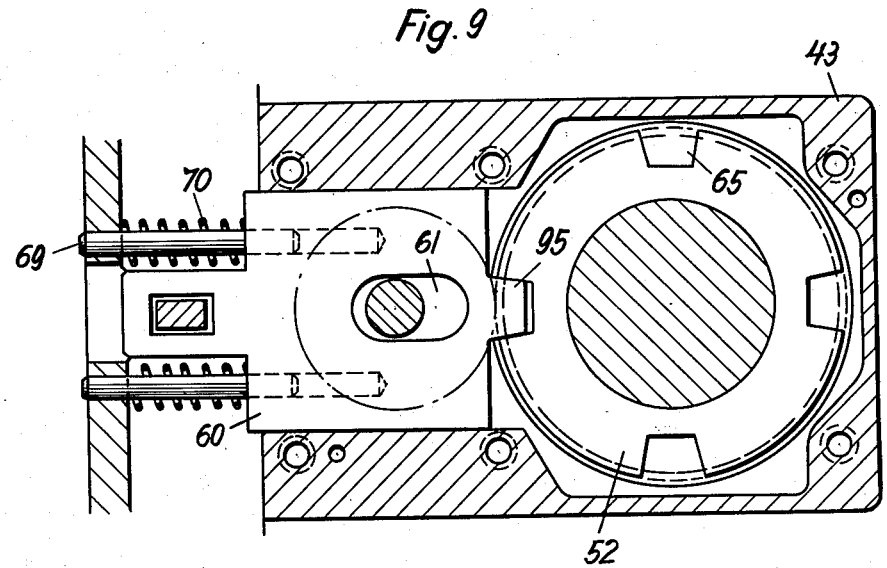

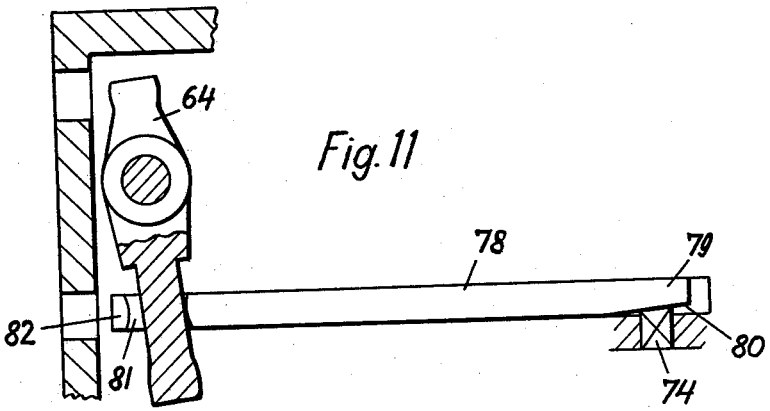
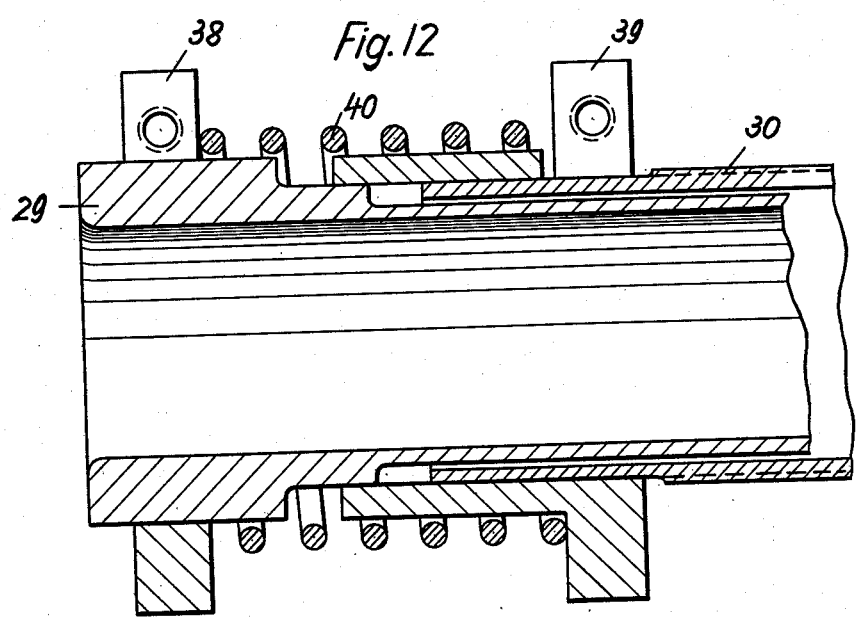

United States Patent Office 3,124,986
Patented Mar. 17, 1964

3,124,986
AUTOMATIC CONTROLS FOR MACHINE TOOLS
Alfred E. Bader and Adolf F. Umgelter, Stuttgart, Germany, assignors to Daimler-Benz Aktiengesellschaft, Stuttgart-Unterturkheim, Germany
Continuation of application Ser. No. 482,352, Jan. 17, 1955. This application June 8, 1959, Ser. No. 818,968
Claims priority, application Germany Jan. 16, 1954
25 Claims. (Cl. 82—3)

The present application is a continuation application of our copending application Serial No. 482,352, filed January 17, 1955, entitled "Automatic Controls for Machine Tools," and now abandoned.

The present invention relates to an automatic control system and arrangement for machine tools, and more specifically to the control arrangement for multiple-spindle automatic lathes, turret lathes, and special machine tools with horizontal or vertical spindles, in particular for machining parts with trunnions, journals or the like diverging spoke-like and symmetrically from a common center.

Prior to this invention, it was necessary for machining such parts to stop the machine after working on each individual trunnion or the like, then to release and open the respective chucking fixture and remount the workpiece in its new position. For machining the four trunnions of such a workpiece, it was, therefore, previously necessary, when using a six-spindle automatic lathe, to remount six entire workpiece units, each four times, and also to start and stop the machine four times.

It is one of the objects of the present invention to provide a mechanism which permits meshing workpieces of symmetrical ray-like or spoke-like shape while requiring only one single mounting and to completely machine the same until in the finished condition thereof without interrupting the operation of the machine. Accordingly, it is an object of the present invention to provide a machine of the type described hereinabove which requires four to six times less manipulation or service and attendance than required by previous machines known in the prior art.

A principal feature of the present invention resides in mounting a chucking fixture for one workpiece unit of the type described hereinabove on each spindle of a lathe or similar machine, and in providing a mechanism for rigidly securing each chucking fixture including the work-holding mandrel or arbor thereof during each work cycle of the machine and thereafter turning such fixture to such an extent that the next trunnion or the like of such workpiece will be moved into the proper machining position.

Another feature of the present invention consists in providing means for driving the rotary motion of the chucking fixture from the advancing motion of the work spindle and, for example, in bar automatics, from the stroke of the chuck-advancing rod. For this purpose, the present invention provides a quick-pitch thread on the advancing rod so as to convert the axial stroke thereof into a rotary motion which is then transmitted over a one-way engaging means to the chucking fixture to advance the same to the next working position.

Another feature of the present invention resides in providing a ratchet mechanism forming a one-way engaging means for transmitting such rotary motion to bevel gears and from such gears through spur gears to the chucking fixture.

Another feature of the invention resides in the provision of an index disk and of an index slide, the latter engaging the index disk at each required instance, for example, when machining a trunnion, to lock the chucking fixture in position and tighten or clamp the same together with the work-holding mandrel. According to the present invention, such operation is effected by a work-advancing rod or tube, while the locking and tightening of the index disk and of the work-holding mandrel is produced by thrust bolts which are pressed upon the index disk by means of thrust pins so as to avoid any blacklash.

Another feature of the present invention consists in the provision of cams for controlling the different movements of the spindles.

Still another feature of the present invention resides in providing ring-like members enclosing all of the spindles of the machine for transmitting the stroke of the control slides simultaneously to all spindles.

Further objects, features and advantages of the invention will appear from a study of the following detailed description thereof when taken in connection with the accompanying drawings, which shows, for purposes of illustration only, one embodiment in accordance with the present invention, and wherein:

FIGURE 5 is an enlarged longitudinal cross-sectional view through the clutching fixture according to the present invention;

FIGURE 6 is an end view taken in the direction of arrow C in FIGURE 5;

FIGURES 7 to 10 are cross-sectional views taken along lines VII—VII, VIII—VIII, IX—IX and X—X, respectively, of FIGURE 5;

FIGURE 11 is a detail view, partly in section, of the thrust lever together with the thrust pins and thrust bolts; while FIGURE 12 is a cross-sectional view through the rear end of the tightening or locking tube with its compression spring and the flanges for compressing such spring.

Figure 3:
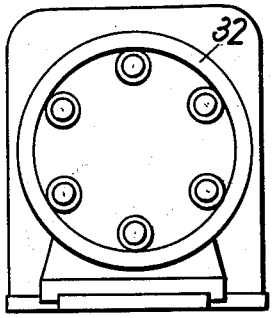
FIGURE 3 is an end view taken in the direction of arrow B in FIGURE 1.
Figure 4:
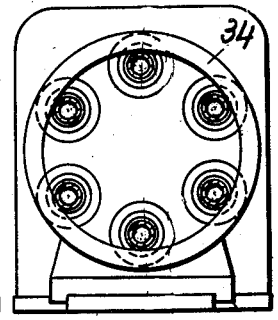
FIGURE 4 is a cross-sectional view taken along line IV—IV of FIGURE 1.

Referring now to the drawings, wherein like reference numerals are used throughout the various views to designate like parts, the bench of a six-spindle bar automatic generally designated by reference numeral 13 has mounted thereon two slides 14 and 15 (FIGURE 1) for controlling the operation of the spindles 16 suitably supported within bearings (not shown) to enable rotation, and one slide 17 for the tool holders 18. Slides 14 and 15 are driven or reciprocated by gear segments 19 and 20, and slide 17 by a gear segment 21. The movement of these gear segments 19, 20 and 21 is controlled by cam slots or cam surfaces 22, 23 and 24, respectively, provided in rotating drums 25 and 26 which are mounted on a rotary driving shaft 27. The drive mechanism for the shaft 27, the tool holders 18 and the rotary motion of spindles 16 may be of any conventional known construction, for example, an electric motor or motors with conventional change-speed gears, and since the drive mechanism does not form part of the present invention, in indicated in the drawing only schematically. Each of the six spindles 16 essentially consists of an inner hollow work-advancing rod or tube 28, an intermediate locking or tightening tube 29, and an outer hollow supporting shaft 30 which is rotatably mounted in a bearing post 31 suitably mounted on the machine bed 13. For simultaneously transmitting the reciprocating movement of slide 14 to the hollow advancing rods 28 of all spindles 16, the rear end of each work-advancing rod 28 has secured thereto a flange or collar 33 bordered on each side by a ring 32 and 32' (FIGURES 1 and 3), which encompass all six rods 28, whereby the two rings 32 and 32' are guided between a pair of stop members or brackets 96 and 97 (FIGURE 1) secured to the slide 14 and thereby form a common actuating means for all work-advancing rods 28. The simultaneous forward stroke of all the tightening or locking tubes 29 is accomplished by a similar ring 34 (FIGURES 1 and 4) which is slidably mounted on the push or work-advancing rods 28 and is taken along in the forward direction by a shoulder 35 on the slide 15 whereby the ring 34 also constitutes a common actuating means for all the locking tubes 29.

The rear ends of each of the locking tubes 29 and of the outer shafts 30 have secured thereto a collar 38 and 39, respectively, for mounting intermediate thereof respective collars 38 and 39 a coil spring 40, whereby springs 40 are adapted to be compressed between collars 38 and 39 during the forward stroke of the locking tubes 29 and thereby effect the simultaneous return stroke of all of the locking tubes 29 together with ring 34 during the return movement of the slide 15.

The forward end portion 41 (FIGURES 1 and 5) of each of the supporting shafts 30 facing the tools 18 carries a chucking fixture according to the present invention which is of generally rectangular shape and screwed into internal threads 42 (FIGURE 5) provided in the rear end of the round housing body thereof generally designated by reference numeral 43. Each housing element 43 has three bearing apertures 44, 45 and 46 (FIGURE 5) for rotatably mounting therein the shafts 47' and 58 of two interengaging bevel gears 47 and 48 respectively and the lower enlarged portion 51 of the workpiece mandrel 49 which rests upon the housing 43 by means of a collar 50. An index disk 52 and a spur gear 53, which are emplaced from below on the stud or pin member 56 forming a coaxial downward extension of work mandrel 49, are secured to the larger central part 51 of the arbor or work mandrel 49 by means of a bolt 54 and cylindrical pins 55. Stud 56 is rotatably mounted in the housing cover 57 which is secured to the housing body 43 in any suitable manner and thereby forms an additional support for the working-piece mandrel or arbor 49. Cover 57 has further rotatably mounted therein the common shaft 58 simultaneously supporting the bevel gear 48 and pinion 59 in mesh with spur gear 53. An index slide 60 is slidably mounted in a direction perpendicular to shaft 58 within the housing 43 intermediate bevel gear 48 and pinion 59, as shown particularly in FIGURES 5 and 9. The index slide 60 is provided with a cutout portion 61 permitting shaft 58 to pass therethrough and enabling a relative movement of index slide 60 transversely to shaft 58; the index slide 60 is further provided with a cutout portion 62 into which engages a flat, disk-like thrust lever 64, shown particularly in FIGURES 7 and 11. The disk-like thrust lever 64 is pivotably secured by means of two set screws 63 (FIGURE 7) in an insert 98 which in turn is secured by bolts 99 (FIGURES 5 and 7) to the housing body 43. The index slide 60 shown in FIGURES 7 and 9, when in the locking position thereof, engages with the lug 95 thereof in one or the other of several notches 65 provided in the index disk 52 (FIGURE 9), which are symmetrically distributed along the periphery thereof, and the number of which should at least correspond to the number of trunnions or the like of the workpiece 66 which are to be machined. The workpiece 66 is thereby clamped tightly during machining thereof between the collar 50 on mandrel or workpiece holder 49 and a washer 68 placed over the workpiece holder 49 by means of a nut 67, as shown in FIGURE 5. Two cylindrical pins 69 (FIGURE 9) serve as a support for coil springs 70 which constantly urge the index slide 60 into the locking position thereof. For purposes of tightening the index disk 52, the housing 43 is provided with two vertical bores 71 and 72 (FIGURE 10) for accommodating therein thrust bolts 73 and 74, and with two horizontal bores 75 and 76 for accommodating therein thrust pins 77 and 78. Thrust pins 77 and 78 are inclined on the forward ends 79 thereof as indicated at 80 (FIGURE 11) and are also notched at 82 (FIGURE 11) in the rear end 81 thereof so as to be taken along by the disk-like actuating thrust lever 64 as shown in FIGURE 7. As the inclined surface 80 of pins 77 and 78 slides toward the right as viewed in FIGURE 11, over the thrust bolts 73 and 74, the index disk 52 and workpiece mandrel or arbor 49 is thereby clamped down and tightened.

The web 83 of the bevel gear 47 (FIGURE 8) is provided with an annular recess 84 into the wall of which are cut or machined four ratchet teeth 85 (FIGURE 8). An annular-shaped nut member 86 (FIGURES 5 and 8) extends into the recess 84 and carries pawl member 87 which is acted upon by a spring 88 (FIGURE 8). The annular nut member 86 is screwed into the outer end of a sleeve 89 and passes through a slightly elongated opening or oval aperture 91 (FIGURE 7) provided in actuating thrust lever 64. Sleeve 89 is provided with internal threads 89' threadably engaging with relatively steep, quick-pitch threads 100 (FIGURE 5) provided on the forward end of threaded shaft or bolt member 90 by means of which sleeve 89 is secured to the end of the hollow push rod 28. The shaft or bolt member 90 is guided by means of a key 101 so as to enable sliding movement thereof only in the axial direction. Thus, when push rod 28 is moved in the direction V, i.e., toward the right, as indicated in FIGURE 5, the threaded portion 100 on shaft 90 also moves toward the right and thereby imparts a right-hand rotation to the sleeve 89 through the quick-pitch threads 100; by the same token, a left-hand rotation is imparted to sleeve 89 when push rod 28 is moved back in the direction R, i.e., toward the left as shown in FIGURE 5. The pawl 87 takes along the bevel gear 47 with a right-hand rotation of sleeve 89, while when moving in the opposite direction, i.e., with a left-hand rotation of sleeve 89, pawl 87 slides along the inner surface of a ratchet tooth 85 until it falls in behind the next tooth 85. The arm 92 (FIGURES 5 and 7) of thrust lever 64 extends into a cutout portion (FIGURES 5 and 7) provided in an extension 94 of the tightening tube 29. Consequently, when the tightening tube 29 moves in the direction V as shown in FIGURE 5, i.e., toward the right, the thrust lever 64 is rotated clockwise, whereby the thrust pins 77 and 78 as well as the index slide 60 are taken along toward the left by the thrust lever 64 due to the opposite movement of the lower lever arm thereof with respect to the upper lever arm so that the index disk 52 and the workpiece mandrel or arbor 49 will be released and unlocked. If the tensioning tube 29 is moved in the direction R, i.e., toward the left as viewed in FIGURE 5, then the thrust lever 64 is rotated counterclockwise so that the index disk 52 and workpiece mandrel 49 will be tightened and locked by the movement of index slide 60 and thrust pins 77 and 78 in the opposite, i.e., in the right direction thereof as viewed in FIGURE 5. The rotation of the bevel gear 47 is transmitted to the index disk 52 and therewith to the workpiece mandrel 49 by the bevel gear 48 and the meshing spur gears 59 and 53. The two arms of thrust lever 64 are made of uneven length so that with a stroke of the tightening tube 29 of only a few millimeters, the index slide 60 is nevertheless moved a sufficient distance to and fro, as the case may be, by lever 64 to produce the desired locking and tightening effect upon the index disk 52 and the workpiece mandrel 49 and to release the same, respectively.

*Operation*

The operation of the entire mechanism in accordance with the present invention will be described now in detail by reference to forward and backward movements of tubes 28 and 29 in the directions V and R, respectively.

Figure 1:
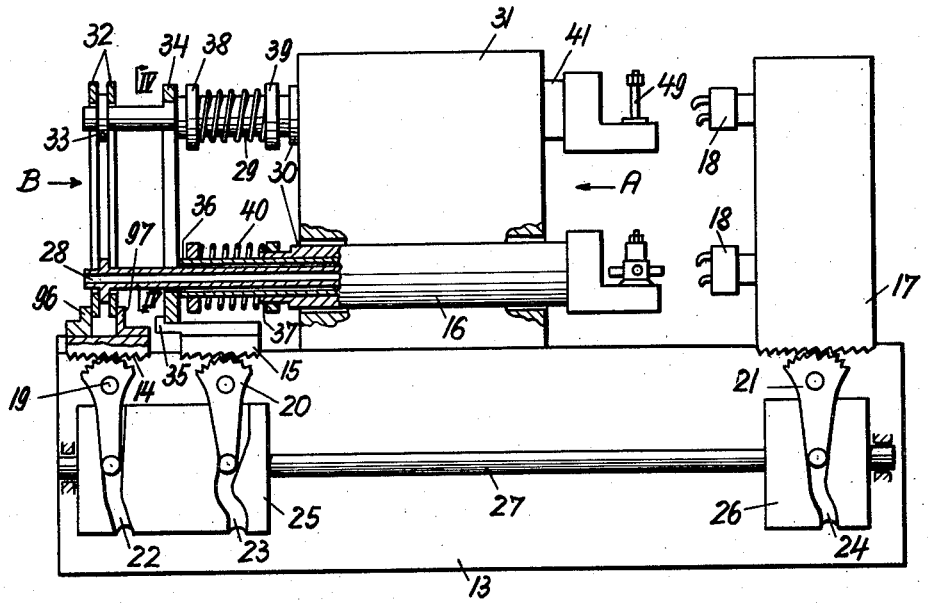
FIGURE 1 is a diagrammatic side view, partly in section, of the general lay-out of a bar automatic according to the present invention provided with the novel clutching and control mechanisms in accordance with the present invention.
Figure 2:
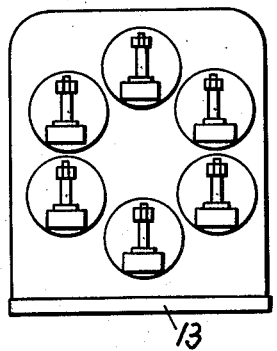
FIGURE 2 is an end view of the machine taken in the direction of the arrow A in FIGURE 1.

Every time the trunnions 66 or similar workpieces are in their proper working position, slide 17 with tool holders 18 is moved by the cam acting in cam slot 24 in the direction towards the trunnions 66 so as to carry out the respective work or machining operations thereon; after the lapse of a predetermined time sufficient to complete the particular machining operation, the tool holders 18 move back to their original position. This is achieved by a suitable selection of the cam and of the instantaneous speed of rotation of shaft 27, and may be realized in any known conventional manner, for example, electrically, mechanically, hydraulically or pneumatically, or any combination thereof. Moreover, since the rotational speed control of shaft 27 may be of any suitable known arrangement which forms no part of the present invention, it is indicated in FIGURE 1 only schematically. At the same time, the cams in slots 22 and 23 which are also driven by shaft 27 produce, by reason of the particular cam surfaces thereof, the following movements of each spindle 16:

(1) At first, each tightening or locking tube 29 moves in the direction V. As a result thereof, the extension 94 of tightening tube 29 moves forwardly toward the right, as viewed in FIGURES 1 and 5, thereby rotates the upper lever arm of thrust lever 64 clockwise whereby the lower lever arm thereof is moved backwardly, i.e., toward the left and therewith also moves the index slide 60 and the thrust pins 77 and 78 toward the left. Consequently, the index disk 52 will be unlocked and released.

(2) The work-advancing rod 28 moves in the direction V, i.e., toward the right as seen in FIGURES 1 and 5, by reason of the particular cam surface of cam 22. As a result thereof, the shaft 90 also moves forwardly in the direction V whereby engagement of the quick-pitch threads 100 thereof with sleeve 89 imparts a right-hand rotation to the sleeve 89 and therewith to the annular nut 86; the pawl 87 engages with a ratchet tooth 85 and thereby also imparts a right-hand rotation to web 83 and therewith to the bevel gear 47. Gear 47, which meshes with the bevel gear 48, thereby rotates the spur gears 59 and 53 resulting in a 90° turn of the workpiece 66.

(3) Next, gear segment 20 engages with a cam portion of cam surface 23 rotating the gear segment counter-clockwise, whereby ring 34 is moved toward the left into the releasing position thereof as viewed in FIGURE 1. Springs 40 thereby urge the tightening tubes 29 in the direction R so that the latter follow the movement of ring 34. The extension 94 thereby withdraws the upper lever arm of the thrust lever 64 toward the left, thereby pushing the lower lever arm of thrust lever 64 together with the index slide 60 to the right into locking engagement with the nose portion 95 thereof in a notch 65 in index disk 52. At the same time, the lower lever arm of thrust lever 64 also moves the thrust pins 77 and 78 toward the right, as viewed in FIGURE 11, into the tightening or clamping position thereof.

(4) The work-advancing rod 28 is moved by the gear segment 19 toward the left in the direction R. As a result thereof, the quick-pitch thread 100 on shaft 90 imparts to the sleeve 89 and therewith to the annular nut 86 a left-hand rotation, thereby turning the pawl 87 counter-clockwise which now only rides over the inner tooth surface 85 until it falls in behind the next preceding tooth 85 without entraining the web portion 83 of nut member 86.

During the machining operation, the tool holders only move in an axial direction whereas the workpiece itself rotates together with its chucking fixture about the axis of tubes 28 and 29 so that the trunnions 66 are machined to be coaxial with shafts 28 and 29 while on the workpiece mandrel 49.

Rotation of each spindle 16 may be achieved in any conventional known manner, for example, by a suitable mechanical drive of the spindles 16. Since the particular drive means for rotating the spindles 16 is of no significance insofar as the present invention is concerned, such drive means has been illustrated in the drawing only schematically.

If a number of workpiece trunnions, journals or the like is to be machined different from that permissible by the number of ratchet teeth in the bevel gear 47 and cutouts 65 in the index disk 52, it is only necessary to exchange the bevel gear 47 and the index disk 52 and to vary the extent of the stroke of the sleeve 89 by adjusting the pivot point of the gear segment 19. Index disks 52 with four cutouts 65 and bevel gears 47 with four ratchet teeth may also be used for machining workpieces with only two journals or trunnions. If the index disk 52 and the bevel gear 47 each have six cutouts and six ratchet teeth, it may be readily seen that they may be used for machining workpieces with two, three, or six journals or trunnions.

As may also be seen from the drawings, the inventive substantially rectangular design of the chucking fixture permits the work to be mounted in the rotary spindles at a very low center height. The entire operation of locking the workpiece in position so as to present one journal or trunnion to the respective tool to be machined thereby, of then releasing it, turning it to present the next journal or trunnion to the tool and again locking it in such position for the next machining operation, and so forth, is controlled without requiring the driving mechanism of the spindles and their rotation to be stopped. Only after completing the entire work on all the journals, trunnions, or the like of all the workpieces mounted in the machine will it be necessary to stop such rotation for mounting a new set of workpieces on the chucking fixtures of the various spindles.

While we have described our invention with reference to the preferred embodiments thereof, we wish to have it understood that it is in no way limited to the details of such embodiments or to the specific examples described, but is capable of numerous modifications within the scope of the appended claims.

What is claimed is:

1. In a semi-automatic machine having a relatively stationary part and spindle means rotatably supported therein an automatic chucking fixture adapted to be secured to said spindle means comprising movable work-piece supporting means adapted to support thereon the work-piece to be machined in a number of different pre-determined positions thereof, indexing means operatively connected with said work-piece supporting means to index the same in said predetermined positions including an indexing disk, clamping means including a sliding member operative to selectively clamp said workpiece supporting means during machining of the work-piece or to release said work-piece supporting means during movement from one of said predetermined positions to the next, tubular work-piece advancing means operatively connected with one of said indexing means and said work-piece supporting means to selectively actuate the same, tubular locking means operatively connected with said clamping means to selectively actuate the same, and thrust bolt means and thrust pin means for tightening said index disk in the locking position thereof.

2. In a semi-automatic machine, the combination according to claim 1, further comprising pivotally supported actuating lever means having two lever arms of unequal length for actuating said index disk and said thrust pin means, one lever arm of said actuating lever arm being operatively connected with said tubular locking means.

3. In a semi-automatic machine, the combination according to claim 2, wherein said index disk is rigidly connected with said workpiece supporting means and with a gear providing the drive thereof.

4. In an at least semi-automatic machine having a relatively stationary part and a plurality of spindle means rotatably supported therein, a semi-automatic chucking fixture for each of said spindle means and each adapted to be secured to a respective one of said spindle means, each semi-automatic chucking fixture comprising movable work-piece supporting means adapted to support thereon the work-piece to be machined in a number of different predetermined positions thereof, indexing means operatively connected with a respective one of said work-piece supporting means to index the same in said predetermined positions, clamping means operative to selectively clamp a respective one of said work-piece supporting means during machining of the work-piece or to release said work-piece supporting means during movement from one of said predetermined positions to the next, tubular work-piece advancing means operatively connected with a respective one of said work-piece supporting means and of said indexing means to selectively actuate the same, tubular locking means operatively connected with a respective one of said clamping means to selectively actuate the same, and common actuating means for actuating in unison at least one of the two tubular means belonging to each spindle means.

5. In a semi-automatic machine, the combination according to claim 4, wherein said common actuating means actuates in unison all of said tubular work-advancing means.

6. In a semi-automatic machine, the combination according to claim 4, wherein said common actuating means actuates in unison all of said tubular locking means.

7. In a semi-automatic machine, the combination according to claim 4, wherein said common actuating means includes first actuating means for actuating in unison all of said tubular work-advancing means, and second actuating means for actuating in unison all of said tubular locking means.

8. In a semi-automatic machine, the combination according to claim 7, further comprising tool holder means for each spindle means, and third actuating means for actuating in unison all of said tool holder means to selectively move the latter toward and away from said work-piece supporting means.

9. In a semi-automatic machine, the combination according to claim 8, further comprising means for driving in common said first, second and third actuating means.

10. In a semi-automatic machine, the combination according to claim 8, further comprising means for rotating said spindle means together with said chucking fixtures.

11. In a semi-automatic machine having a relatively stationary part and spindle means rotatably supported therein, an automatic chucking fixture adapted to be secured to said spindle means comprising movable work-piece supporting means adapted to support thereon the work-piece to be machined in a number of different predetermined positions thereof, indexing means operatively connected with said work-piece supporting means to index the same in said predetermined positions including an indexing disk disposed essentially parallel to said spindle means, clamping means including a slide member disposed essentially parallel to said spindle means and operative to selectively clamp said work-piece supporting means during machining of the work-piece or to release said work-piece supporting means during movement from one of said predetermined positions to the next, tubular work-piece advancing means operatively connected with one of said indexing means and said work-piece supporting means to selectively actuate the same, tubular locking means operatively connected with said clamping means to selectively actuate the same, said first connecting means including a gear wheel, and said indexing disk and said gear wheel being interchangeable to adapt the machine to the particular number of surfaces of the work-piece to be machined, and actuating means for actuating said tubular work-advancing means including a pivotally secured toothed segment, said toothed segment being adjustable as to the pivot point thereof to enable adjustment of said movement from one of said positions to the next position of said work-piece supporting means.

12. In a lathe having a tool holder and at least one tool therein, a chucking mechanism opposite to said tool holder for consecutively machining a plurality of parts of a work-piece extending outwardly symmetrically from a common center thereof, said chucking mechanism comprising at least one work spindle and a work-piece mandrel, means substantially within said spindle and movable in the axial direction thereof for securing and locking said work-piece on said mandrel in a certain position so that one part thereof may be machined by said tool and for then releasing said work-piece, second means substantially within said spindle and also movable in the axial direction thereof, means for converting the axial movement of said second means into a rotary movement for rotating said mandrel independently of the rotation of said spindle so as to present the next part of said work-piece to said tool, means for reciprocating said two axially movable means, and means for automatically controlling the sequence of operation of said last-mentioned means so that, after said work-piece has once been mounted on said fixture, said spindle is rotated continuously, and during such rotation, said work-piece is locked in one position so as to present one part thereof to said tool to be machined thereby, is released thereafter and rotated independently of the rotation of said spindle to present the next part to said tool, and is thereupon locked again in the position for the next work cycle.

13. In a mechanism, the combination as defined in claim 12, wherein said two axially movable means within said spindle include a central shaft and a tubular member around said shaft and coaxial therewith, said motion-converting means including a quick-pitch thread on said shaft and a tubular sleeve rotatably mounted on said shaft and driven by said thread.

14. In a mechanism, the combination as defined in claim 12, wherein said two axially movable means within said spindle include a central shaft and a tubular member around said shaft and coaxially therewith, said motion-converting means including a quick-pitch thread on said shaft and a tubular sleeve rotatably mounted on said shaft and driven by said thread, and further comprising ratchet means connected to said sleeve, and a gear system driven by said ratchet means and connected to said work-supporting mandrel for rotating the same in only one direction.

15. In a mechanism, the combination as defined in claim 12, wherein said two axially movable means within said spindle include a central shaft and a tubular member around said shaft and coaxially therewith, further comprising an index disk secured to said work-supporting mandrel and having a plurality of notches therein corresponding to the number of work parts to be machined on each work-piece, an index slide adapted to engage during each working cycle in one of said notches, and means for connecting said tubular member with said index slide.

16. In a mechanism, the combination as defined in claim 15, further comprising means for locking said index disk in a fixed position upon engagement during each working cycle with said index slide.

17. In a mechanism, the combination as defined in claim 15, further comprising means for locking said index disk and work-supporting mandrel in a fixed position when said index disk during each working cycle is in engagement with said index slide.

18. In a mechanism, the combination as defined in claim 15, wherein said last-mentioned means comprises a thrust lever pivotally connected at opposite ends with said tubular member and said index slide, and means for pivotally mounting said lever about an axis transverse to the direction of movement of said tubular member and slide.

19. In a mechanism, the combination as defined in claim 15, wherein said last-mentioned means comprises a thrust lever pivotally connected at opposite ends with said tubular member and said index slide, and means for pivotally mounting said lever eccentrically thereof about an axis transverse to the direction of movement of said tubular member and slide.

20. In a mechanism, the combination as defined in claim 14, further comprising an index disk rigidly secured to said work-supporting mandrel and having a plurality of notches therein, said ratchet means having a plurality of teeth, the number of said notches and ratchet teeth corresponding to the number of work parts to be machined on each work-piece, an index slide adapted to engage during each working cycle in one of said notches, means for connecting said tubular member with said index slide so as to transmit the axial movement of said tubular member to said index slide to engage and disengage the same with one of the notches of said index disk, said gear system including a driven gear rigidly secured to said work-supporting mandrel, said mandrel having a shaft, a casing enclosing said ratchet means, said gear system, said index slide, said index disk, and said connecting means; and said work-supporting mandrel, said index disk, and said driven gear having a common shaft, and means for rotatably mounting said shaft in said casing near the end thereof facing said tool holder.

21. In a mechanism, the combination as defined in claim 15, further comprising resilient means acting on said index slide to assist in maintaining said slide in engagement with said index disk.

22. In a mechanism as defined in claim 12, wherein said automatic control means includes rotary driving means, and cams connecting said last-mentioned driving means with said axially slideable means and with said rotary means.

23. In a mechanism, the combination as defined in claim 13, wherein said automatic control means includes a drive shaft, means for rotating said drive shaft, and a pair of cams connecting said drive shaft with said two axially movable means, respectively, so as to move said means independently of each other.

24. In a mechanism, the combination as defined in claim 13, wherein said automatic control means includes a drive shaft, means for rotating said drive shaft, a pair of cams on said drive shaft, a pair of levers connected at one end with said cams and at the other end with said two axially movable means, respectively, so as to move said means independently of each other, means for pivotally mounting said levers, and means for adjusting the pivoting point of at least one of said levers so as to vary the stroke of at least one of said axially movable means.

25. In a mechanism as defined in claim 20, wherein said ratchet means and said index disk are removably mounted in said mechanism so as to be exchangeable for others having a different number of teeth and notches therein in accordance with the different number of parts on said work-piece to be machined by said tool.

References Cited in the file of this patent

UNITED STATES PATENTS

| | | |
|---|---|---|
| 1,765,130 | Cone | June 17, 1930 |
| 1,830,981 | Class | Nov. 10, 1931 |
| 2,236,440 | Miller | Mar. 25, 1941 |
| 2,480,715 | De Graff | Aug. 30, 1949 |
| 2,572,161 | Kirally | Oct. 23, 1951 |
| 2,621,937 | Hunziker | Dec. 16, 1952 |
| 2,732,216 | Sloan et al. | Jan. 24, 1956 |
| 2,773,333 | Johansson | Dec. 11, 1956 |
| 2,953,069 | Smith | Sept. 20, 1960 |

FOREIGN PATENTS

| | | |
|---|---|---|
| 6,117 | Great Britain | Apr. 9, 1891 |